US011824600B2

(12) United States Patent
Abdelghaffar et al.

(10) Patent No.: US 11,824,600 B2
(45) Date of Patent: Nov. 21, 2023

(54) FAST SWITCHING OF MULTIPLE TRANSMIT RECEIVE POINT TRANSMISSION SCHEME

(71) Applicant: QUALCOMM Incorporated, San Diego, CA (US)

(72) Inventors: Muhammad Sayed Khairy Abdelghaffar, San Jose, CA (US); Michael Levitsky, Rehovot (IL); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 17/219,372

(22) Filed: Mar. 31, 2021

(65) Prior Publication Data

US 2022/0321174 A1   Oct. 6, 2022

(51) Int. Cl.
*H04W 72/12* (2023.01)
*H04W 80/02* (2009.01)
*H04W 72/23* (2023.01)
*H04B 7/024* (2017.01)

(52) U.S. Cl.
CPC ............ *H04B 7/024* (2013.01); *H04W 72/12* (2013.01); *H04W 72/23* (2023.01); *H04W 80/02* (2013.01)

(58) Field of Classification Search
CPC ... H04B 7/024; H04B 7/0689; H04W 72/042; H04W 72/12; H04W 80/02; H04W 76/15
See application file for complete search history.

(56) References Cited

U.S. PATENT DOCUMENTS

| 2020/0267748 A1 | 8/2020 | Khoshnevisan et al. |
| 2021/0105780 A1* | 4/2021 | Jin ..................... H04L 5/0053 |
| 2022/0104237 A1* | 3/2022 | Muruganathan ...... H04L 5/0035 |

FOREIGN PATENT DOCUMENTS

WO    2020201995 A1    10/2020

OTHER PUBLICATIONS

NTT Docomo, Inc, Discussion on MTRP for reliability, 3GPP TSG RAN WG1 #104-e, e-Meeting, Jan. 25-Feb. 5, 2021, R1-2101598. (Year: 2021).*
Nokia, Nokia Shanghai Bell, Enhancements for Multi-TRP URLLC schemes, 3GPP TSG RAN WG1 #103 Meeting, e-Meeting, Oct. 26-Nov. 13, 2020, R1-2008904. (Year: 2020).*
International Search Report and Written Opinion—PCT/US2022/070499—ISA/EPO—dated May 27, 2022.
Nokia, et al., "Enhancements for Multi-TRP URLLC Schemes", R1-2008904, 3rd Generation Partnership Project, Mobile Competence Centre, 650, Route Des Lucioles, F-06921, Sophia-Antipolis Cedex, France, vol. RAN WG1, No. e-Meeting, Oct. 26, 2020-Nov. 3, 2020, Oct. 23, 2020, XP051945419, 19 Pages.

(Continued)

*Primary Examiner* — Shailendra Kumar
(74) *Attorney, Agent, or Firm* — Harrity & Harrity, LLP

(57) ABSTRACT

Various aspects of the present disclosure generally relate to wireless communication. In some aspects, a user equipment (UE) may receive a medium access control (MAC) message indicating a switch to a multiple transmit receive point (M-TRP) transmission scheme. The UE may perform a communication using the M-TRP transmission scheme in accordance with the MAC message. Numerous other aspects are described.

26 Claims, 13 Drawing Sheets

(56) References Cited

OTHER PUBLICATIONS

NTT Docomo, Inc: "Discussion on MTRP for Reliability", R1-2101598, 3GPP TSG RAN WG1 #104-e, 3rd Generation Partnership Project, Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 19, 2021, XP051971753, 16 Pages.
Qualcomm Incorporated: "Summary #1 of email Discussion [102-e-NR-feMIM0-02]", R1-2007180, 3rd Generation Partnership Project, Mobile Competence Centre, 650, Route Des Lucioles, F-06921, Sophia-Antipolis Cedex, France, vol. RAN WG1, No. e-meeting, Aug. 17, 2020-Aug. 28, 2020, Aug. 27, 2020 (Aug. 27, 2020), XP051922605, 64 Pages.

* cited by examiner

FAST SWITCHING OF MULTIPLE TRANSMIT RECEIVE POINT TRANSMISSION SCHEME

FIELD OF THE DISCLOSURE

Aspects of the present disclosure generally relate to wireless communication and to techniques and apparatuses for fast switching of a multiple transmit receive point transmission scheme.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a medium access control (MAC) message indicating a switch to a multiple transmit receive point (M-TRP) transmission scheme; and performing a communication using the M-TRP transmission scheme in accordance with the MAC message.

In some aspects, a method of wireless communication performed by a base station includes transmitting, to a UE, a MAC message indicating a switch to an M-TRP transmission scheme; and performing a communication using the M-TRP transmission scheme in accordance with the MAC message.

In some aspects, a UE includes one or more memories and one or more processors, coupled to the one or more memories, configured to: receive a MAC message indicating a switch to an M-TRP transmission scheme; and perform a communication using the M-TRP transmission scheme in accordance with the MAC message.

In some aspects, a base station includes one or more memories and one or more processors, coupled to the one or more memories, configured to: transmit, to a UE, a MAC message indicating a switch to an M-TRP transmission scheme; and perform a communication using the M-TRP transmission scheme in accordance with the MAC message.

In some aspects, a non-transitory computer-readable medium storing a set of instructions includes one or more instructions that, when executed by one or more processors of an UE, cause the UE to: receive a MAC message indicating a switch to an M-TRP transmission scheme; and perform a communication using the M-TRP transmission scheme in accordance with the MAC message.

In some aspects, a non-transitory computer-readable medium storing a set of instructions includes one or more instructions that, when executed by one or more processors of a base station, cause the base station to: transmit, to a UE, a MAC message indicating a switch to an M-TRP transmission scheme; and perform a communication using the M-TRP transmission scheme in accordance with the MAC message.

In some aspects, an apparatus includes means for receiving a MAC message indicating a switch to an M-TRP transmission scheme; and means for performing a communication using the M-TRP transmission scheme in accordance with the MAC message.

In some aspects, an apparatus includes means for transmitting, to a UE, a MAC message indicating a switch to an M-TRP transmission scheme; and means for performing a communication using the M-TRP transmission scheme in accordance with the MAC message.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
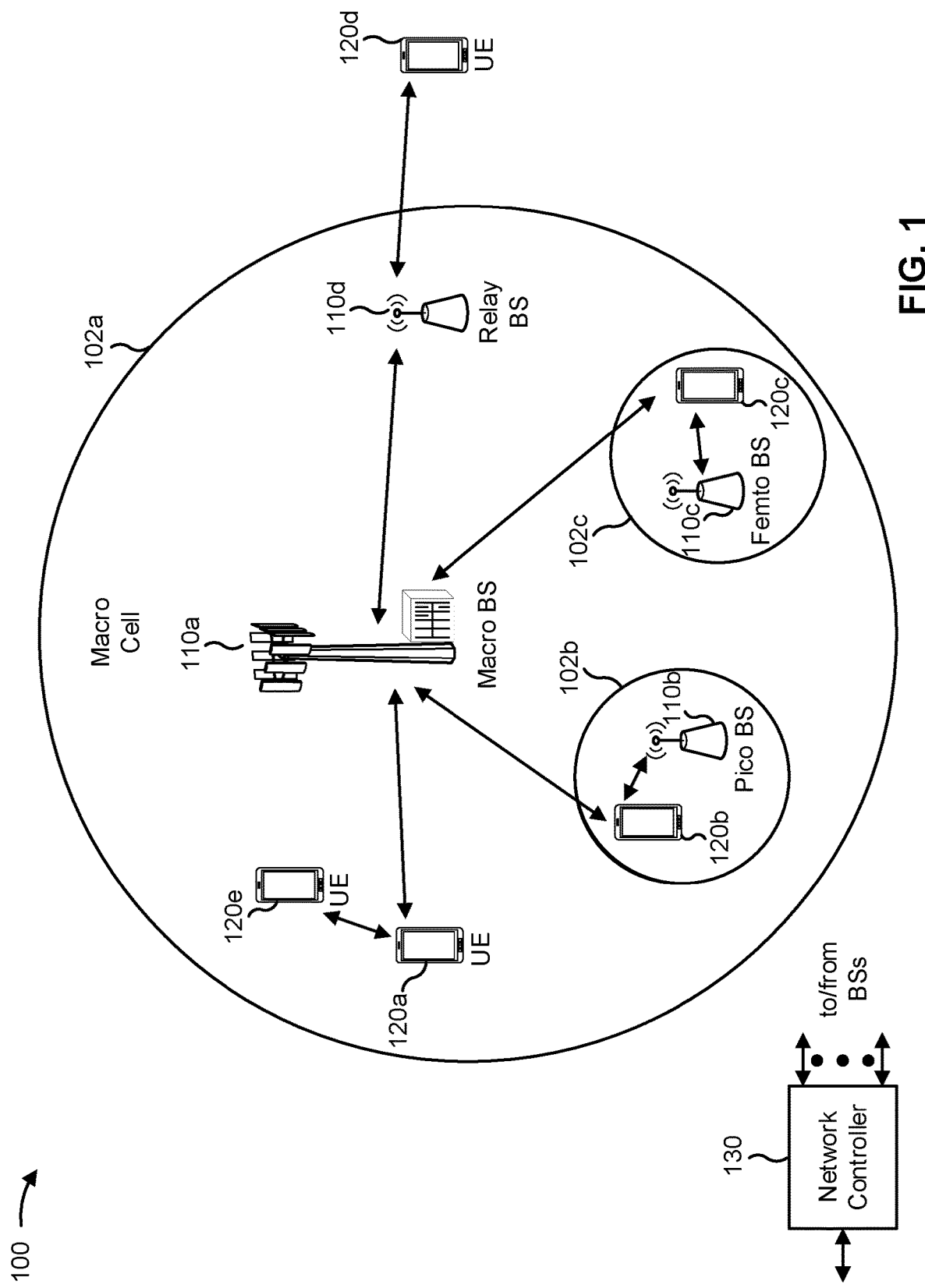
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein. In some cases, multiple BSs (such as multiple TRPs, or a gNB and multiple TRPs) may implement a single frequency network (SFN). Techniques described herein support the switching of multiple TRP (M-TRP) transmission schemes using MAC messaging, which may support the usage of SFNs, particularly in applications such as high speed transit.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based at least in part on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
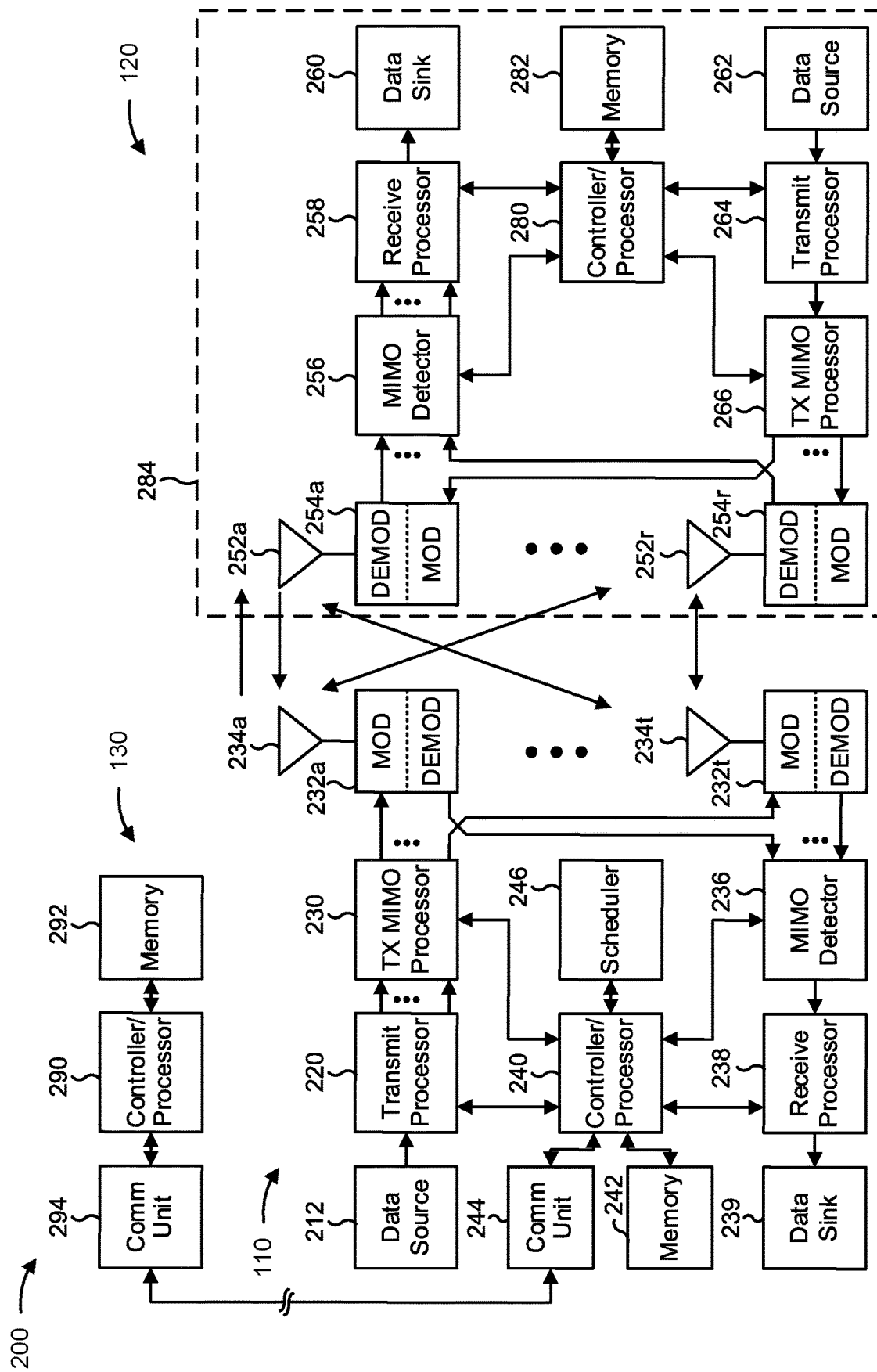
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-11).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-11).

Controller/processor 240 of base station 110, controller/processor 280 of UE 120, and/or any other component(s) of FIG. 2 may perform one or more techniques associated with a fast adaptation of a multiple transmit receive point transmission scheme, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some aspects, executing instructions may include running the instructions, converting the instructions, compiling the instructions, and/or interpreting the instructions, among other examples.

In some aspects, the UE includes means for receiving a medium access control (MAC) message indicating a switch to a multiple transmit receive point (M-TRP) transmission scheme; and/or means for performing a communication using the M-TRP transmission scheme in accordance with the MAC message. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for transmitting, to a UE, a MAC message indicating a switch to an M-TRP transmission scheme; and/or means for performing a communication using the M-TRP transmission scheme in accordance with the MAC message. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
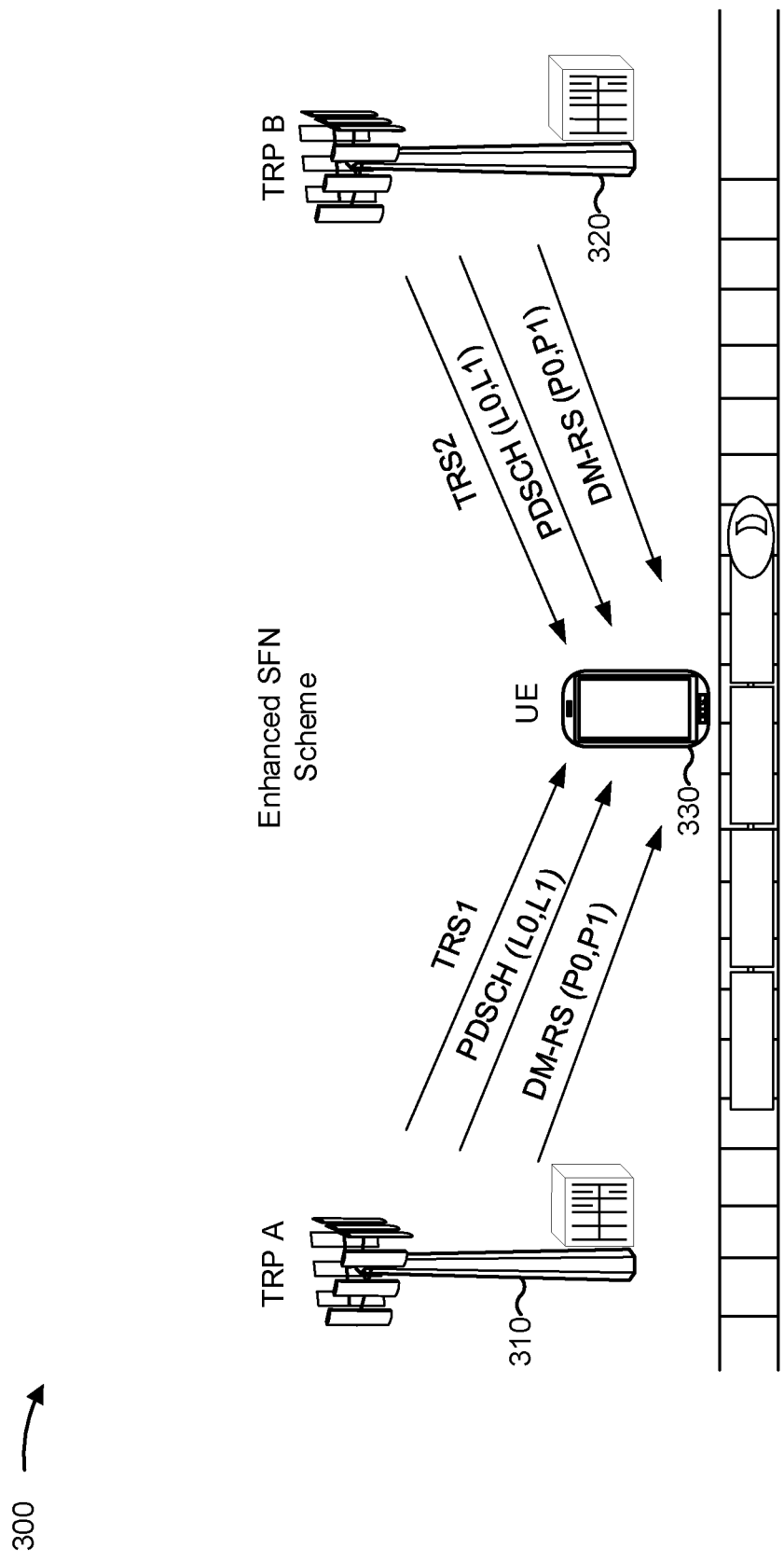
FIG. 3 is a diagram illustrating an example of multiple transmit receive point communication, in accordance with the present disclosure.

FIG. 3 is a diagram illustrating an example 300 of multiple transmit receive point communication (sometimes referred to as multi-panel communication), in accordance with the present disclosure. As shown in FIG. 3, multiple TRPs (shown as TRP A 310 and TRP B 320) may communicate with the same UE 330 in a single frequency network (SFN).

An SFN may have a network configuration in which multiple cells (for example, multiple BSs or multiple cells associated with a single BS) simultaneously transmit the same signal over the same frequency channel. For example, an SFN may be a broadcast network. An SFN may enable an extended coverage area without the use of additional frequencies, which facilitates communication for UEs moving at high speed since the extended coverage area obviates the need for frequent complex mobility operations. For example, an SFN configuration may include multiple BSs in an SFN area that transmit one or more identical signals using the same frequency at the same, or substantially the same, time.

In some situations, an SFN configuration may include other network devices, such as multiple transmit and receive points (TRPs) corresponding to the same BS. The multiple TRPs may provide coverage for an SFN area. The multiple TRPs may transmit one or more identical signals using the same frequency at the same, or substantially the same, time. The identical signal(s) simultaneously transmitted by the multiple TRPs may include a physical downlink shared channel (PDSCH) signal, a control resource set (CORESET) scheduling the PDSCH, or a reference signal (for example, a synchronization signal block (SSB), a channel state information reference signal (CSI-RS), a tracking reference signal (TRS), a DMRS, or another reference signal), among other examples. Accordingly, when the multiple TRPs simultaneously transmit the same signal to a UE, the SFN configuration may be transparent to the UE, and the UE may aggregate, or accumulate, the simultaneous signal transmissions from the multiple TRPs, which may provide higher signal quality or higher tolerance for multipath attenuation, among other benefits.

As shown in example 300, the multiple TRPs (M-TRPs) may communicate with the same UE 330 in a coordinated manner (e.g., using coordinated multipoint transmissions) to improve reliability and/or increase throughput. The TRPs may coordinate such communications via an interface between the TRPs (e.g., a backhaul interface and/or an access node controller). The interface may have a smaller delay and/or higher capacity when the TRPs are co-located at the same base station (e.g., when the TRPs are different antenna arrays or panels of the same base station), and may have a larger delay and/or lower capacity (as compared to co-location) when the TRPs are located at different base stations. The different TRPs may communicate with the UE 330 using different PDSCH transmission schemes, different quasi co-location (QCL) relationships (e.g., different TCI states), different DMRS ports, and/or different layers (e.g., of a multi-layer communication), among other examples.

For some M-TRP transmissions, a single physical downlink control channel (PDCCH) may be used to schedule downlink data communications for a single physical downlink shared channel (PDSCH). In this case, multiple TRPs (e.g., TRP A 310 and TRP B 320) may transmit communications to the UE 330 on the same PDSCH. For example, a communication may be transmitted using a single codeword with different spatial layers for different TRPs (e.g., where one codeword maps to a first set of layers transmitted by TRP A 310 and maps to a second set of layers transmitted by TRP B 320). As another example, a communication may be transmitted using multiple codewords, where different codewords are transmitted by different TRPs (e.g., using different sets of layers). In either case, different TRPs may use different QCL relationships (e.g., identified by different TCI states) for different DMRS ports corresponding to different layers. For example, TRP A 310 may use a first QCL relationship or a first TCI state for a first set of DMRS ports corresponding to a first set of layers, and TRP B 320 may use a second (different) QCL relationship or a second (different) TCI state for a second (different) set of DMRS ports corresponding to a second (different) set of layers. In some cases, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for M-TRP transmission, as discussed herein). Thus, the signaling of a DCI identifying multiple TCI states can be used to indicate that the UE 330 should perform M-TRP communication.

As another M-TRP transmission example, multiple PDCCHs may be used to schedule downlink data communications for multiple corresponding PDSCHs (e.g., one PDCCH for each PDSCH). In this case, a first PDCCH may schedule a first codeword to be transmitted by TRP A 310, and a second PDCCH may schedule a second codeword to be transmitted by TRP B 320. Furthermore, first DCI (e.g., transmitted by TRP A 310) may schedule a first PDSCH communication associated with a first set of DMRS ports with a first QCL relationship (e.g., indicated by a first TCI state) for TRP A 310, and second DCI (e.g., transmitted by TRP B 320) may schedule a second PDSCH communication associated with a second set of DMRS ports with a second QCL relationship (e.g., indicated by a second TCI state) for TRP B 320. In this case, DCI (e.g., having DCI format 1_0 or DCI format 1_1) may indicate a corresponding TCI state for a TRP corresponding to the DCI. The TCI field of a DCI indicates the corresponding TCI state (e.g., the TCI field of the first DCI indicates the first TCI state and the TCI field of the second DCI indicates the second TCI state).

Generally, a communication may be associated with a TRP based at least in part on a parameter associated with a control resource set (CORESET) of control information associated with the communication. For example, a CORESET pool index parameter may be set to a first value if the communication is associated with a first TRP, and may be set to a second parameter if the communication is associated with a second TRP. A reference herein to "a communication associated with a first TRP" (or the like) should be understood to refer to "a communication associated with a first CORESET parameter," and a reference herein to "a communication associated with a second TRP" (or the like) should be understood to refer to "a communication associated with a second CORESET parameter."

Example M-TRP transmission schemes are described in further detail below, with reference to FIG. 4.

As indicated above, FIG. 3 is provided as an example. Other examples may differ from what is described with respect to FIG. 3.

Figure 4:
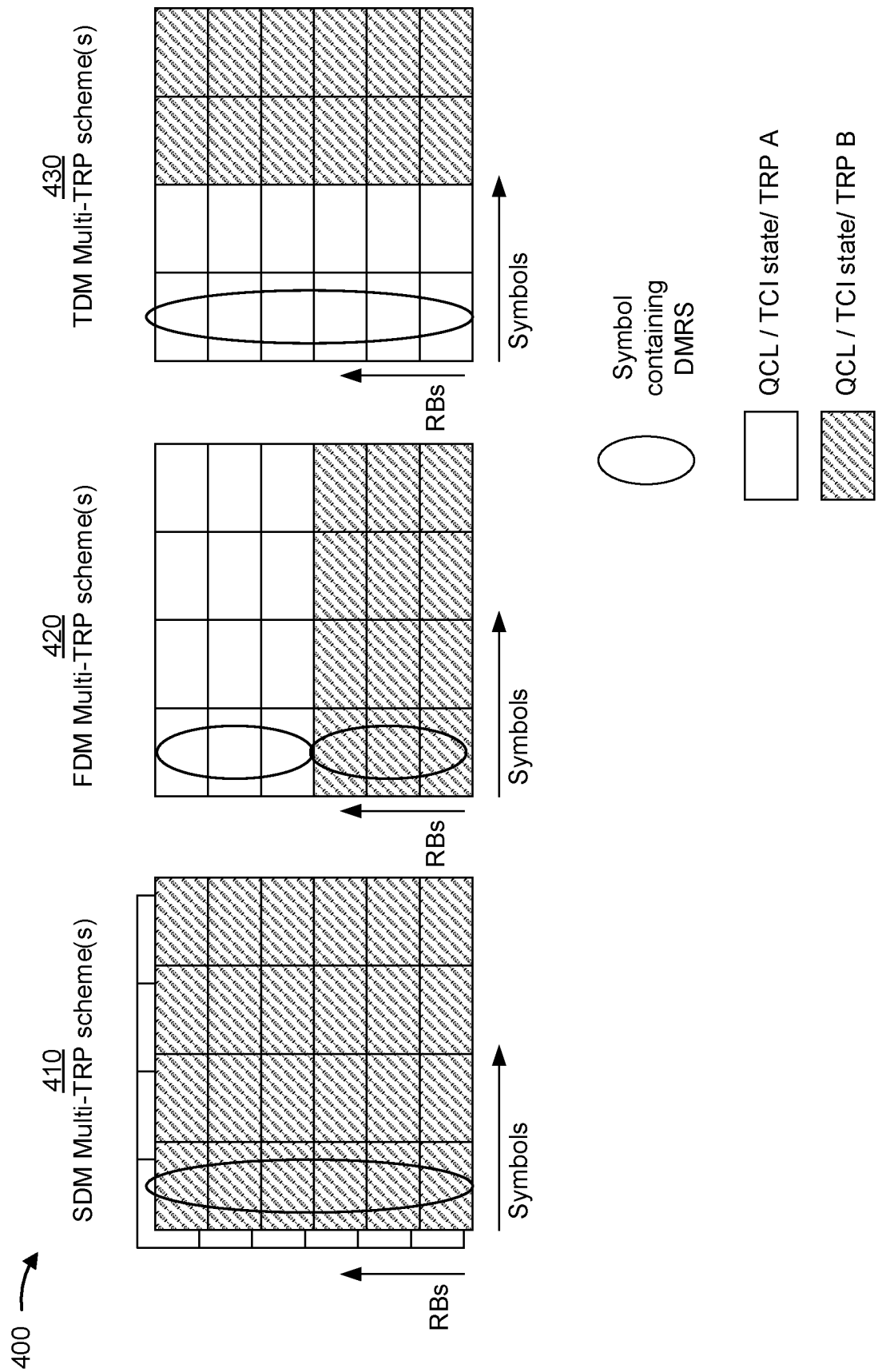
FIG. 4 is a diagram illustrating examples of multiple transmit receive point transmission schemes, in accordance with the present disclosure.

FIG. 4 is a diagram illustrating examples 400 of M-TRP communication schemes, in accordance with the present disclosure. Examples 400 include a spatial division multiplexing (SDM) scheme 410, a frequency division multiplexing (FDM) scheme 420, and a time division multiplexing (TDM) scheme 430. As shown, the vertical axis represents frequency (e.g., resource blocks (RBs)) and the horizontal axis represents time (e.g., symbols such as OFDM symbols). A time/frequency resource associated with a first QCL state, corresponding to a first TCI state associated with TRP A (e.g., the first group), is indicated by a white fill, and a time/frequency resource associated with a second QCL state, corresponding to a second TCI state associated with TRP B (e.g., the second group) is shown by a diagonal fill. Symbols containing a DMRS are shown by ovals.

A UE may be configured (such as via RRC signaling) with a plurality of TCI states, such as up to 128 TCI states. A subset of these TCI states may be activated, such as via MAC signaling. An activated TCI state can be indicated to be used for a communication via DCI, such as via a TCI codepoint field of the DCI. A TCI state may indicate one or more QCL parameters for a communication, and may indicate a source signal from which the one or more QCL parameters are to be derived. For example, the source signal may be a synchronization signal block, a channel state information reference signal, or the like. The TCI state indicated for an M-TRP communication may be interpreted according to an active M-TRP communication scheme. An M-TRP communication scheme is a configuration that indicates parameters and assumptions for communications between a UE and a set of TRPs.

The SDM scheme 410 may be referred to as scheme 1a in some contexts. In the SDM scheme 410, different TRPs may transmit different spatial layers in overlapping time/frequency resources (e.g., overlapping RBs/symbols). In such a case, the different spatial layers may be transmitted with different TCI states since the different spatial layers are transmitted by different TRPs. In some aspects, DMRS ports corresponding to different TCI states may be in different code division multiplexing (CDM) groups. As just one example, two layers (e.g., DMRS ports 0 and 1 in a first CDM group) may be transmitted with a first TCI state, and two layers (e.g., DMRS ports 2 and 3 in a second CDM group) may be transmitted with a second TCI state.

The FDM scheme 420 may be referred to as scheme 2 in some contexts. In the FDM scheme 420, different sets of RBs are transmitted by the different TRPs using different TCI states. For example, in a first FDM scheme, referred to as scheme 2a, one codeword may be transmitted in both sets of RBs. In a second FDM scheme, referred to as scheme 2b, two codewords of the same transport block may be transmitted (e.g., with a same redundancy version (RV) value or with different RV values).

The TDM scheme 430 may include two schemes, which may be referred to as scheme 3 and scheme 4. In the TDM scheme 430 generally, different sets of symbols (e.g., different mini-slots or slots) may be transmitted with different TCI states, and repetitions of the communication may be performed. In scheme 3, repetitions may be performed within a slot. In scheme 4, repetitions may be performed across slots. For scheme 4, a number of repetitions (e.g., a number of transmission occasions) may be dynamically indicated by a time domain resource allocation (TDRA) field in DCI. The TDRA field in the DCI may point to a row of a time domain allocation list, wherein the row indicates a mapping type, a K0 value (that is, a slot offset), and a starting symbol and length. For scheme 4, a number of repetitions may be indicated by the time domain allocation list.

In scheme 4, in some aspects, a same mapping type, same starting symbol, and same length may be applied to all transmission occasions. When a TCI field in the DCI indicates two TCI states, the mapping between transmission occasions and TCI states may be configured using a cyclical mapping (e.g., TCI states #1, #2, #1, #2 are mapped to 4 transmission occasions) or a sequential mapping (e.g., TCI states #1, #1, #2, #2 are mapped to 4 transmission occasions). In some configurations, a maximum of two layers may be used. In the case of two layers being used, the two DMRS ports of the two layers may belong to the same DMRS CDM group. Thus, a limited number of DMRS port entries may be needed.

An SFN may be associated with an M-TRP transmission scheme. An M-TRP transmission scheme for an SFN is referred to herein as an "SFN M-TRP transmission scheme." One example of an SFN M-TRP transmission scheme is illustrated in FIG. 3. As shown, using the SFN M-TRP transmission scheme illustrated in FIG. 3 (which may be referred to as an enhanced SFN M-TRP transmission scheme or scheme 1) multiple TRPs may transmit TRSs in a TRP-specific (e.g., non-SFN) manner, as indicated by the first TRP transmitting TRS1 and the second TRP transmitting TRS2. Furthermore, the two TRPs may transmit DMRSs and PDSCHs in a non-TRP specific (e.g., SFN) manner.

While an SFN M-TRP transmission scheme may, in some situations, provide higher signal quality, higher reliability, or higher tolerance for multipath attenuation (among other benefits), switching between the SFN M-TRP transmission scheme (e.g., scheme 1) and other schemes (e.g., schemes 1a-4), is non-trivial, given that the TCI states are used by the other schemes for M-TRP PDSCH transmissions. Semi-static (e.g., radio resource control (RRC)-based) switching would depend on RRC configuration, which has high latency and ambiguity in determining whether the UE switched to a new scheme. Dynamic switching may enable fast switching between schemes, but would come at the cost of increased UE complexity (e.g., TRS, DMRS, and demodulation complexity, among other examples), as different schemes require different receiver processing and different receiver architecture.

As indicated above, FIG. 4 is provided as an example. Other examples may differ from what is described with respect to FIG. 4.

In some aspects described herein, a TRP may transmit a MAC message indicating a switch to an M-TRP transmission scheme. A UE may receive the MAC message and perform one or more communications using the M-TRP transmission scheme in accordance with the MAC message. For example, the UE may activate an M-TRP transmission scheme or may switch M-TRP transmission schemes based at least in part on the MAC message (e.g., in accordance with a time indicated by the MAC message and/or UE capabilities). Further MAC messages may be used to update/change the M-TRP transmission scheme, such as in a situation where another MAC message indicates a TCI state for future M-TRP transmissions. The TRP may transmit scheduling information prior to switching the M-TRP transmission scheme (e.g., to schedule communications to be performed after switching the M-TRP transmission scheme) and perform communications using the M-TRP transmission scheme indicated by the MAC message.

In this way, some techniques and apparatuses described herein enable fast switching between M-TRP transmission schemes using Layer 2 (L2) MAC control element (MAC-CE) based signaling to switch between the different M-TRP transmission schemes. This addresses the concerns regarding latency and ambiguity while providing the UE with enough time to reconfigure receiver processing. In addition, MAC-CE based signaling does not require additional signaling overhead in DCI and also does not require changing DCI format and/or adding new types. As a result, a UE may quickly switch between M-TRP transmission schemes without incurring significant overhead, conserving resources (e.g., processing resources, time resources, memory resources, and/or power resources, among other examples) that would otherwise be consumed by a UE to switch between M-TRP transmission schemes.

Figure 5:
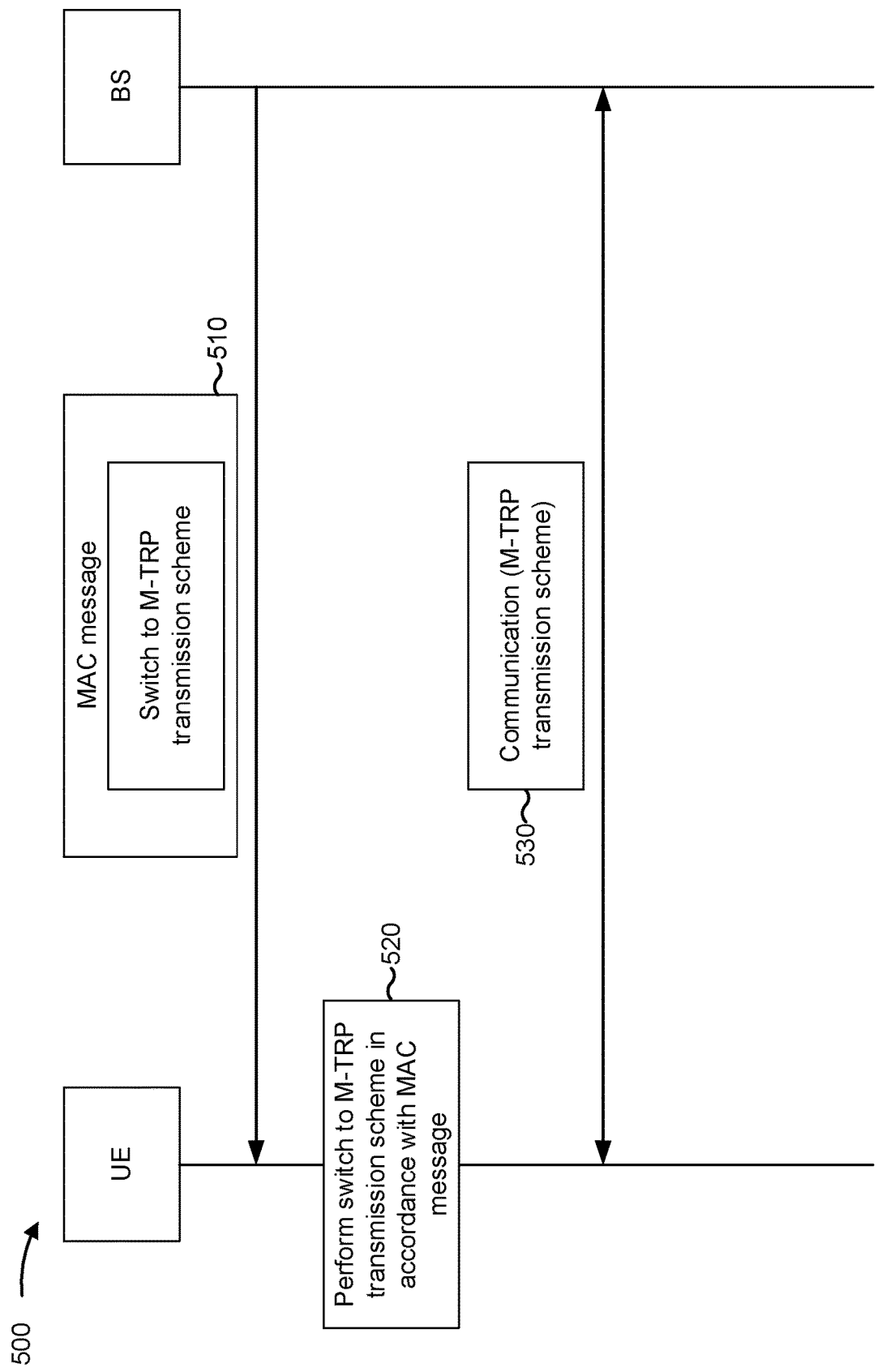
FIG. 5 is a diagram illustrating examples associated with fast adaptation of a multiple transmit receive point transmission scheme, in accordance with the present disclosure.

FIG. 5 is a diagram illustrating an example 500 associated with fast adaptation of a multiple transmit receive point transmission scheme, in accordance with the present disclosure. As shown in FIG. 5, a base station (e.g., base station 110) and a UE (e.g., UE 120) may communicate with one another.

As shown by reference number 510, the base station may transmit, and the UE may receive, a MAC message indicating a switch to an M-TRP transmission scheme. For example, the MAC message may indicate to activate an M-TRP transmission scheme or to switch from one M-TRP transmission scheme to another M-TRP transmission scheme. In some aspects, the MAC message may include a MAC-CE command dedicated for switching semi-static M-TRP transmission schemes, which may enable switching between semi-static configured M-TRP transmission schemes (e.g., schemes 2a, 2b, 3, and 4), switching between an enhanced SFN M-TRP transmission scheme (e.g., scheme 1) and a semi-static configured M-TRP transmission scheme, and/or switching between an enhanced SFN M-TRP transmission scheme (e.g., scheme 1) and the SDM M-TRP transmission scheme (e.g., scheme 1a).

In some aspects, the M-TRP transmission scheme may include an M-TRP transmission scheme associated with an SFN, a TDM-based M-TRP transmission scheme, an FDM-based M-TRP transmission scheme, or an SDM-based M-TRP transmission scheme, as described in connection with FIGS. 3 and 4.

In some aspects, the UE may update a repetition scheme parameter and/or a high speed capability parameter based at least in part on the MAC message. For example, reception of the MAC-CE may cause the UE to update one or more higher layer parameters (e.g., RRC parameters, such as RepSchemeEnabler and/or highSpeedDemodFlag-r16, among other examples).

In some aspects, the MAC message may indicate a time associated with the switch to the M-TRP transmission scheme. For example, the MAC message may indicate a timestamp point when an indicated M-TRP transmission scheme should be activated. In some aspects, the time may be measured as beyond a MAC-CE processing timeline. For example, if a MAC-CE processing timeline is 3 ms, and the indicated time is Y, then the time may be measured as (3 ms+Y). In some aspects, the time may be based at least in part on a capability of the UE. For example, the UE may report capability data that indicates how fast the UE is capable of switching between M-TRP transmission schemes. The UE may report, for example, a value of X ms, and the timestamp point for switching to the new M-TRP transmission scheme may be based at least in part on the 3 ms MAC-CE processing timeline plus X ms (e.g., timestamp may be 3 ms+X ms). The UE may report multiple switching times between the multiple M-TRP transmission schemes. For example, the UE may report a switching time of X1 ms for switching between TDM and FDM schemes, a switching time of X2 ms for switching between SFN schemes and SDM schemes, and so on. While a 3 ms MAC-CE processing timeline is provided as an example, other MAC-CE processing timelines may be used in calculating the timestamp point for switching M-TRP transmission schemes (e.g., 2 ms, 4 ms, or 5 ms, among other examples).

Figure 6:
FIG. 6 is a diagram illustrating an example associated with a transmission configuration indicator (TCI) activation message used for fast adaptation of a multiple transmit receive point transmission scheme, as described further herein.

In some aspects, the MAC message may be a TCI activation message, and a bit of the TCI activation message (or more generally, a part of the TCI activation message) may indicate the M-TRP transmission scheme. FIG. 6 is a diagram illustrating an example 600 associated with a TCI activation message used for fast adaptation of an M-TRP transmission scheme. For example, and as shown in FIG. 6, a reserved bit, R, of a TCI activation MAC-CE command may be used to indicate the M-TRP transmission scheme. In some aspects, the bit indicates whether to use an M-TRP transmission scheme associated with an SFN (such as scheme 1) or an M-TRP transmission scheme not associated with an SFN (e.g., scheme 1a, 2a, 2b, 3, or 4). In some aspects, the bit of the TCI activation message may indicate whether one or more activated TCI codepoints of the TCI activation message map to an M-TRP transmission scheme associated with an SFN or to an M-TRP scheme not associated with an SFN. For example, an R value of 0 may indicate an enhanced SFN M-TRP transmission scheme, while an R value of 1 may indicate a non-SFN M-TRP transmission scheme (e.g., scheme 1a, 2a, 2b, 3, or 4).

In some aspects, the base station may transmit, and the UE may receive, configuration information that indicates multiple modes associated with multiple M-TRP transmission schemes, including the M-TRP transmission scheme indicated in the MAC message. In some aspects, the multiple modes may be referred to as transmission modes or PDSCH transmission modes (e.g., multiple PDSCH-Config parameters, each associated with a transmission mode). In some aspects, the configuration information may indicate one or more parameters associated with the multiple modes. For example, prior to first activation of an M-TRP transmission scheme, the UE may assume an RRC configured mode or a predefined default mode (such as a default mode specified in a wireless communication standard, a mode configured by an original equipment manufacturer of the UE, an essential file of the UE, or the like). Before receiving the MAC-CE command, the UE communicates to the base station using the default transmission mode. In some aspects, the UE may have a predefined or RRC configured table of different transmission modes, at least some of which are unavailable (e.g., unable to be switched to) based at least in part on DCI.

Figure 7:
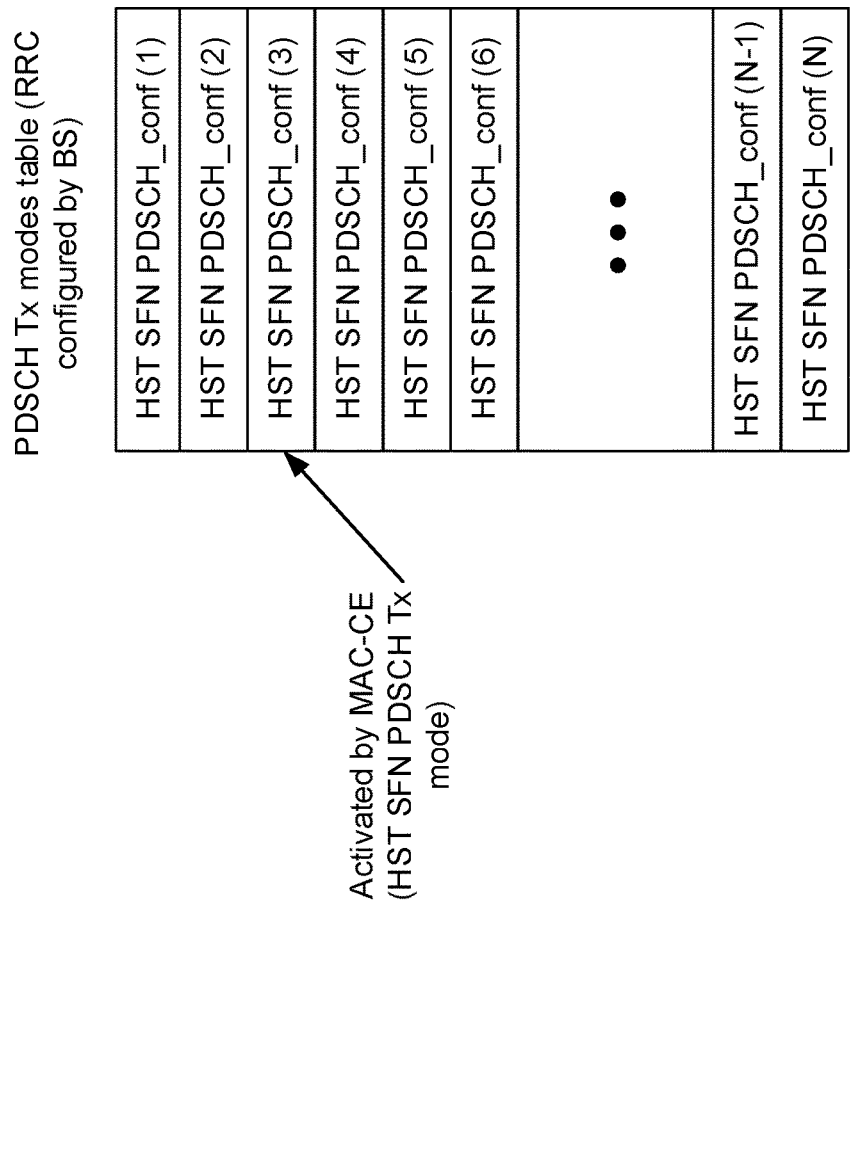
FIG. 7 is a diagram illustrating an example associated with transmission modes associated with fast adaptation of a multiple transmit receive point transmission scheme, as described further herein.

FIG. 7 is a diagram illustrating an example 700 associated with transmission modes associated with fast adaptation of M-TRP transmission schemes, as described further herein. For example, as shown in FIG. 7, the UE may store a table of PDSCH transmission modes (RRC configured by the base station), and a PDSCH transmission mode may be activated by a MAC-CE indicating an SFN PDSCH transmission mode. In some aspects, the UE may update the predefined or RRC configured table to address other transmission modes, which may correspond to different methods of TRS transmission, different schemes of SFN transmission, and/or non-SFN DMRS transmission, among other examples.

In some aspects, the MAC message indicates one or more modes associated with two or more M-TRP transmission schemes, including the M-TRP transmission scheme. In this situation, the base station may transmit, and the UE may receive, DCI indicating the M-TRP transmission scheme, and performing the communication may be based at least in part on the DCI. For example, the MAC-CE may activate more than one PDSCH transmission mode, and DCI may indicate one of the schemes associated with the PDSCH transmission mode. In some aspects, the activated PDSCH transmission modes may be associated with similar receiver processing, such as a similar transmission configuration, a similar number of layers, a similar reference signaling configuration, or the like, which may simplify transmission mode switching at the UE and/or the base station.

As shown by reference number 520 in FIG. 5, the UE may switch to the M-TRP transmission scheme in accordance with the MAC message. In some aspects, the M-TRP transmission scheme may be a first M-TRP transmission scheme, and the UE may switch from a second M-TRP transmission scheme (e.g., different from the first M-TRP transmission scheme) based at least in part on the MAC message. In some aspects, and as discussed in further detail above, the MAC message may indicate a time associated with the switch to the M-TRP transmission scheme, and the UE may switch to the M-TRP transmission scheme in accordance with the time indicated by the MAC message.

In some aspects, the base station may transmit, and the UE may receive, scheduling information, prior to switching to the M-TRP transmission scheme. The scheduling information may schedule a communication to be performed after switching to the M-TRP transmission scheme, using either the same M-TRP transmission scheme as was used to receive the scheduling information, or using the M-TRP transmission scheme indicated by the MAC message, as described further herein.

As shown by reference number 530, the UE and the base station may perform a communication performed using the M-TRP transmission scheme associated with the MAC message. For example, one or more TRPs (which may include the base station) may transmit a PDSCH, a reference signal, or the like, in accordance with the M-TRP transmission scheme. The UE may receive the PDSCH, reference signal, or the like in accordance with the M-TRP transmission scheme.

In some aspects, the MAC message may be a first MAC message. The base station may transmit, and the UE may receive, a second MAC message indicating a TCI state for the M-TRP transmission scheme. In this situation, the communication may be performed based at least in part on the TCI state. This may enable, for example, the UE to activate/re-activate different TCI codepoints for the new M-TRP transmission scheme.

Figure 8:
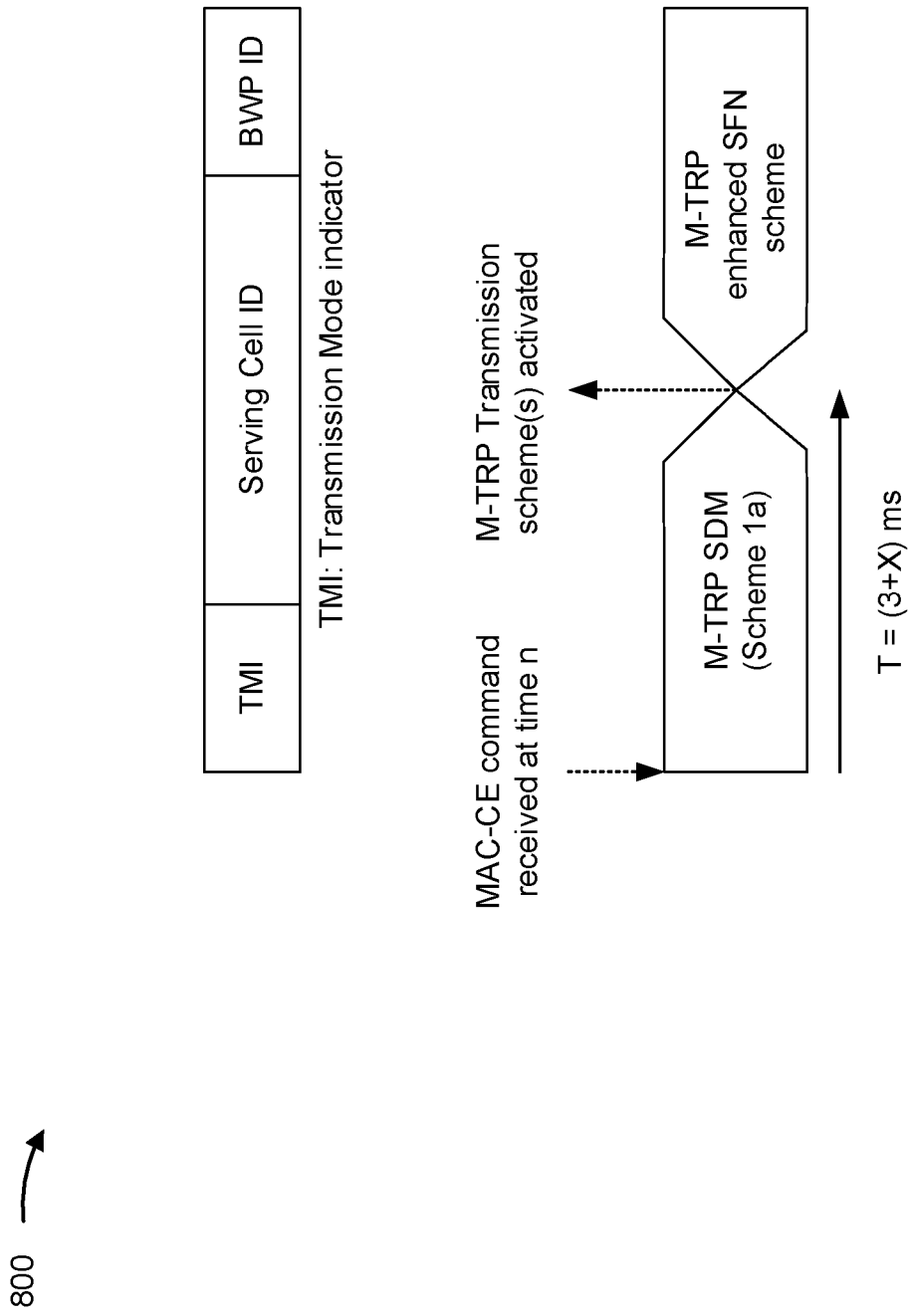
FIG. 8 is a diagram illustrating an example associated with fast adaptation of a multiple transmit receive point transmission scheme, as described further herein.

FIG. 8 is a diagram illustrating an example 800 associated with fast adaptation of an M-TRP transmission scheme (e.g., based at least in part on TCI state). In some aspects, the communication may be performed using the most recent TCI state of the UE. For example, and as shown in FIG. 8, the MAC-CE command (e.g., included in the MAC message) may be received at a time n and activated at a time n+T, where T=(3+X) ms. In this situation, 3 ms may be a pre-configured MAC-CE processing time, and X may be based at least in part on UE-reported processing capabilities. At the time n+T, the UE switches from an M-TRP SDM transmission scheme (e.g., scheme 1a) to an M-TRP enhanced SFN scheme. In this example, transmissions sent after the time n+T are performed using the M-TRP enhanced SFN scheme, as the M-TRP enhanced SFN scheme was indicated by the most recent TCI state of the UE.

Figure 9:
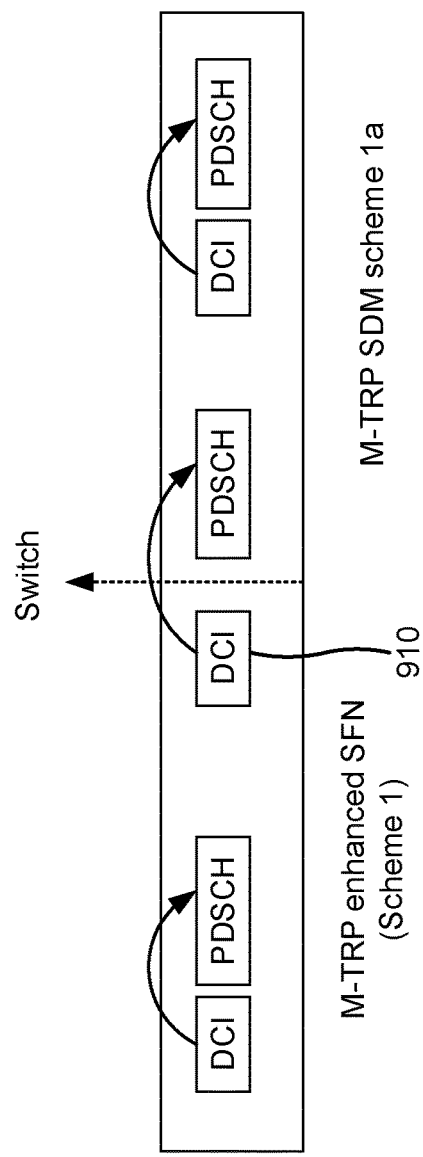
FIG. 9 is a diagram illustrating an example associated with scheduling information used for fast adaptation of a multiple transmit receive point transmission scheme, as described further herein.

In some aspects, as discussed herein, the base station may transmit, and the UE may receive, scheduling information (e.g., a scheduling DCI) prior to switching to the M-TRP transmission scheme. FIG. 9 is a diagram illustrating an example 900 associated with scheduling information used for fast adaptation of M-TRP transmission scheme. For example, as shown in FIG. 9 by reference number 910, the UE may receive a scheduling DCI, indicating a PDSCH transmission, where the scheduling DCI is received prior to switching to the M-TRP transmission scheme, and the PDSCH is not scheduled to arrive until after the switch to the M-TRP transmission scheme.

In this situation, in some aspects, the UE may perform the communication (e.g., receive the PDSCH) using the same M-TRP transmission scheme used to receive the scheduling information. This may enable the UE to receive the communication using a triggering DCI transmission scheme (that is, an M-TRP transmission scheme used to transmit the triggering DCI. In other aspects, the UE may perform the communication using the M-TRP transmission scheme indicated by the MAC message. This may enable, for example, the UE to receive a PDSCH using the new M-TRP transmission scheme indicated by the MAC message. In yet other aspects, the UE may treat the scheduling information as an error (e.g., in a situation where the UE receives scheduling information prior to switching to the M-TRP transmission scheme, and the scheduling information schedules a reception after switching to the M-TRP transmission scheme.

As indicated above, FIG. 5-9 are provided as examples. Other examples may differ from what is described with respect to FIGS. 5-9.

In this way, some techniques and apparatuses described herein enable fast switching between M-TRP transmission schemes using layer 2 (L2) MAC-CE based signaling to switch between the different M-TRP transmission schemes. This addresses the concerns regarding latency and ambiguity while providing the UE with enough time to reconfigure receiver processing. In addition, MAC-CE based signaling does not require additional signaling overhead in DCI and also does not require changing DCI format and/or adding new types. As a result, a UE may quickly switch between M-TRP transmission schemes without incurring significant overhead, conserving resources (e.g., processing resources, time resources, memory resources, and/or power resources, among other examples) that would otherwise be consumed by a UE to switch between M-TRP transmission schemes.

Figure 10:
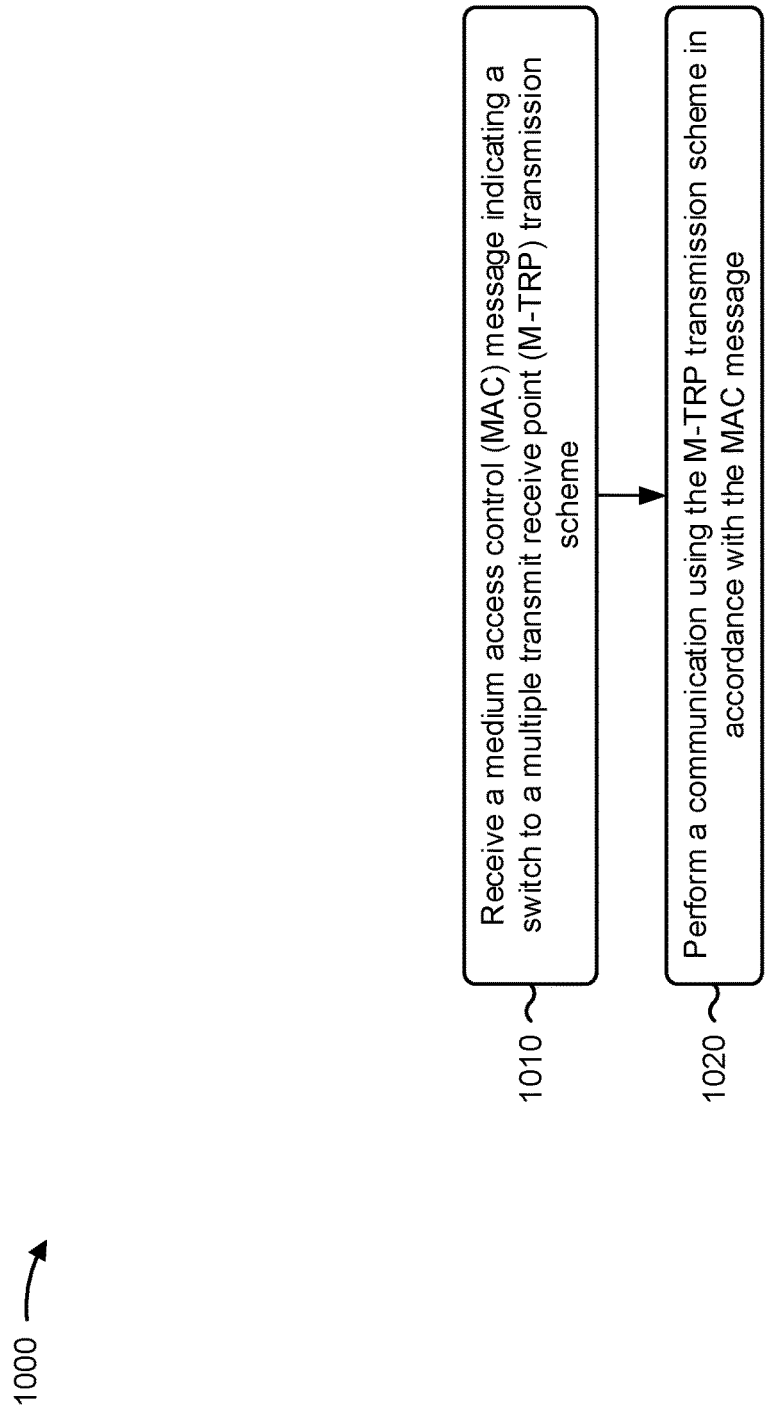
FIGS. 10 and 11 are diagrams illustrating example processes associated with fast adaptation of a multiple transmit receive point transmission scheme, in accordance with the present disclosure.

FIG. 10 is a diagram illustrating an example process 1000 performed, for example, by an UE, in accordance with the present disclosure. Example process 1000 is an example where the UE (e.g., UE 120) performs operations associated with fast adaptation of multiple transmit receive point transmission scheme.

As shown in FIG. 10, in some aspects, process 1000 may include receiving a MAC message indicating a switch to an M-TRP transmission scheme (block 1010). For example, the UE (e.g., using reception component 1202, depicted in FIG. 12) may receive a MAC message indicating a switch to an M-TRP transmission scheme, as described above.

As further shown in FIG. 10, in some aspects, process 1000 may include performing a communication using the M-TRP transmission scheme in accordance with the MAC message (block 1020). For example, the UE (e.g., using transmission component 1204, depicted in FIG. 12) may perform a communication using the M-TRP transmission scheme in accordance with the MAC message, as described above.

Process 1000 may include additional aspects, such as any single aspect or any combination of aspects described below and/or in connection with one or more other processes described elsewhere herein.

In a first aspect, the MAC message indicates a time associated with the switch to the M-TRP transmission scheme, and process 1000 includes switching to the M-TRP transmission scheme in accordance with the time.

In a second aspect, alone or in combination with the first aspect, the time is based at least in part on a capability of the UE.

In a third aspect, alone or in combination with one or more of the first and second aspects, process 1000 includes updating a repetition scheme parameter or a high speed capability parameter based at least in part on the MAC message.

In a fourth aspect, alone or in combination with one or more of the first through third aspects, the MAC message is a first MAC message, and process 1000 includes receiving a second MAC message indicating a TCI state for the M-TRP transmission scheme, wherein performing the communication is based at least in part on the TCI state.

In a fifth aspect, alone or in combination with one or more of the first through fourth aspects, the communication is performed using a most recent TCI state of the UE.

In a sixth aspect, alone or in combination with one or more of the first through fifth aspects, the MAC message is a TCI activation message, and a bit of the TCI activation message indicates the M-TRP transmission scheme.

In a seventh aspect, alone or in combination with one or more of the first through sixth aspects, the bit indicates whether to use an M-TRP transmission scheme associated with a single frequency network or an M-TRP scheme not associated with a single frequency network.

In an eighth aspect, alone or in combination with one or more of the first through seventh aspects, the bit indicates whether one or more activated TCI codepoints of the TCI activation message map to an M-TRP transmission scheme associated with a single frequency network or to an M-TRP scheme not associated with a single frequency network.

In a ninth aspect, alone or in combination with one or more of the first through eighth aspects, process 1000 includes receiving scheduling information prior to switching to the M-TRP transmission scheme, wherein the scheduling information schedules the communication to be performed after switching to the M-TRP transmission scheme, and wherein performing the communication further comprises performing the communication using a same M-TRP transmission scheme as was used to receive the scheduling information.

In a tenth aspect, alone or in combination with one or more of the first through ninth aspects, process 1000 includes receiving scheduling information prior to switching to the M-TRP transmission scheme, wherein the scheduling information schedules the communication to be performed after switching to the M-TRP transmission scheme, and wherein performing the communication further comprises performing the communication using the M-TRP transmission scheme indicated by the MAC message.

In an eleventh aspect, alone or in combination with one or more of the first through tenth aspects, process 1000 includes receiving scheduling information prior to switching to the M-TRP transmission scheme, wherein the scheduling information schedules a reception after switching to the M-TRP transmission scheme, and process 1000 includes treating the scheduling information as an error.

In a twelfth aspect, alone or in combination with one or more of the first through eleventh aspects, process 1000 includes receiving configuration information indicating a plurality of modes associated with a plurality of M-TRP transmission schemes, wherein the MAC message indicates a mode, of the plurality of modes, associated with the M-TRP transmission scheme.

In a thirteenth aspect, alone or in combination with one or more of the first through twelfth aspects, the MAC message indicates one or more modes associated with two or more M-TRP transmission schemes including the M-TRP transmission scheme, and process 1000 includes receiving downlink control information indicating the M-TRP transmission scheme, wherein performing the communication is based at least in part on the downlink control information.

In a fourteenth aspect, alone or in combination with one or more of the first through thirteenth aspects, the configuration information indicates one or more parameters associated with the plurality of modes.

In a fifteenth aspect, alone or in combination with one or more of the first through fourteenth aspects, the M-TRP transmission scheme is a first M-TRP transmission scheme, and process 1000 includes switching from a second M-TRP transmission scheme to the first M-TRP transmission scheme based at least in part on the MAC message.

In a sixteenth aspect, alone or in combination with one or more of the first through fifteenth aspects, the M-TRP transmission scheme is one of an M-TRP transmission scheme associated with a single frequency network, a time division multiplexing based M-TRP transmission scheme, a frequency division multiplexing based M-TRP transmission scheme, or a spatial division multiplexing based M-TRP transmission scheme.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
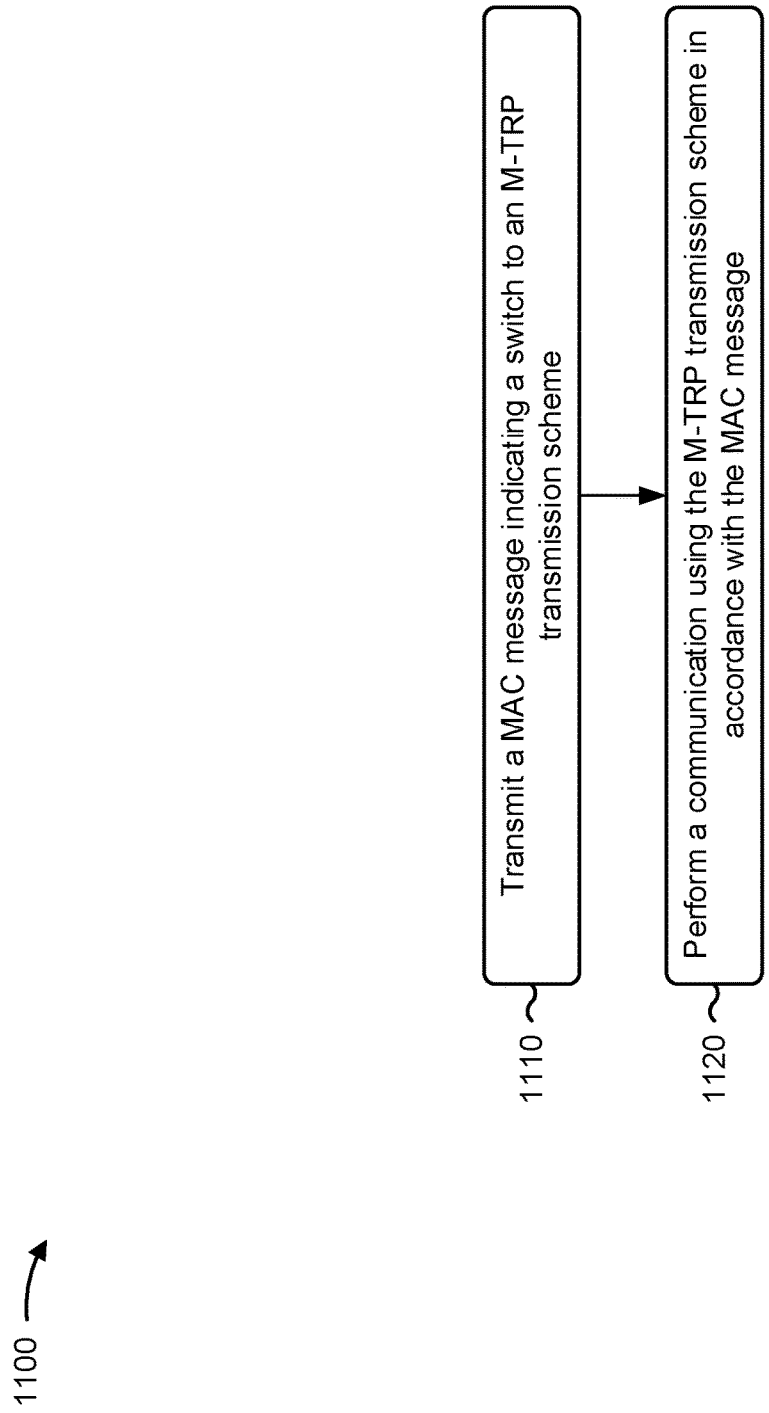

FIG. 11 is a diagram illustrating an example process 1100 performed, for example, by a base station, in accordance with the present disclosure. Example process 1100 is an example where the base station (e.g., base station 110) performs operations associated with fast adaptation of multiple transmit receive point transmission scheme.

As shown in FIG. 11, in some aspects, process 1100 may include transmitting, to a UE, a MAC message indicating a switch to an M-TRP transmission scheme (block 1110). For example, the base station (e.g., using transmission component 1304, depicted in FIG. 13) may transmit, to a UE, a MAC message indicating a switch to an M-TRP transmission scheme, as described above.

As further shown in FIG. 11, in some aspects, process 1100 may include performing a communication using the M-TRP transmission scheme in accordance with the MAC message (block 1120). For example, the base station (e.g., using transmission component 1304, depicted in FIG. 13) may perform a communication using the M-TRP transmission scheme in accordance with the MAC message, as described above.

Process 1100 may include additional aspects, such as any single aspect or any combination of aspects described below and/or in connection with one or more other processes described elsewhere herein.

In a first aspect, the MAC message indicates a time associated with the switch to the M-TRP transmission scheme, and process 1100 includes switching to the M-TRP transmission scheme in accordance with the time.

In a second aspect, alone or in combination with the first aspect, the time is based at least in part on a capability of the UE.

In a third aspect, alone or in combination with one or more of the first and second aspects, the MAC message is a first MAC message, and process 1100 includes transmitting a second MAC message indicating a TCI state for the M-TRP transmission scheme, wherein performing the communication is based at least in part on the TCI state.

In a fourth aspect, alone or in combination with one or more of the first through third aspects, the communication is performed using a most recent TCI state of the UE.

In a fifth aspect, alone or in combination with one or more of the first through fourth aspects, the MAC message is a TCI activation message, and a bit of the TCI activation message indicates the M-TRP transmission scheme.

In a sixth aspect, alone or in combination with one or more of the first through fifth aspects, the bit indicates whether to use an M-TRP transmission scheme associated with a single frequency network or an M-TRP scheme not associated with a single frequency network.

In a seventh aspect, alone or in combination with one or more of the first through sixth aspects, the bit indicates whether one or more activated TCI codepoints of the TCI activation message map to an M-TRP transmission scheme associated with a single frequency network or an M-TRP scheme not associated with a single frequency network.

In an eighth aspect, alone or in combination with one or more of the first through seventh aspects, process 1100 includes transmitting scheduling information prior to switching to the M-TRP transmission scheme, wherein the scheduling information schedules the communication to be performed after switching to the M-TRP transmission scheme, and wherein performing the communication further comprises performing the communication using a same M-TRP transmission scheme as was used to transmit the scheduling information.

In a ninth aspect, alone or in combination with one or more of the first through eighth aspects, process 1100 includes transmitting scheduling information prior to switching to the M-TRP transmission scheme, wherein the scheduling information schedules the communication to be performed after switching to the M-TRP transmission scheme, and wherein performing the communication further comprises performing the communication using the M-TRP transmission scheme indicated by the MAC message.

In a tenth aspect, alone or in combination with one or more of the first through ninth aspects, process 1100 includes transmitting configuration information indicating a plurality of modes associated with a plurality of M-TRP transmission schemes, wherein the MAC message indicates a mode, of the plurality of modes, associated with the M-TRP transmission scheme.

In an eleventh aspect, alone or in combination with one or more of the first through tenth aspects, the MAC message indicates one or more modes associated with two or more M-TRP transmission schemes including the M-TRP transmission scheme, and process 1100 includes transmitting downlink control information indicating the M-TRP transmission scheme, wherein performing the communication is based at least in part on the downlink control information.

In a twelfth aspect, alone or in combination with one or more of the first through eleventh aspects, the configuration information indicates one or more parameters associated with the plurality of modes.

In a thirteenth aspect, alone or in combination with one or more of the first through twelfth aspects, the M-TRP transmission scheme is a first M-TRP transmission scheme, and process 1100 includes switching from a second M-TRP transmission scheme to the first M-TRP transmission scheme based at least in part on the MAC message.

In a fourteenth aspect, alone or in combination with one or more of the first through thirteenth aspects, the M-TRP transmission scheme is one of an M-TRP transmission scheme associated with a single frequency network, a time division multiplexing based M-TRP transmission scheme, a frequency division multiplexing based M-TRP transmission scheme, or a spatial division multiplexing based M-TRP transmission scheme.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
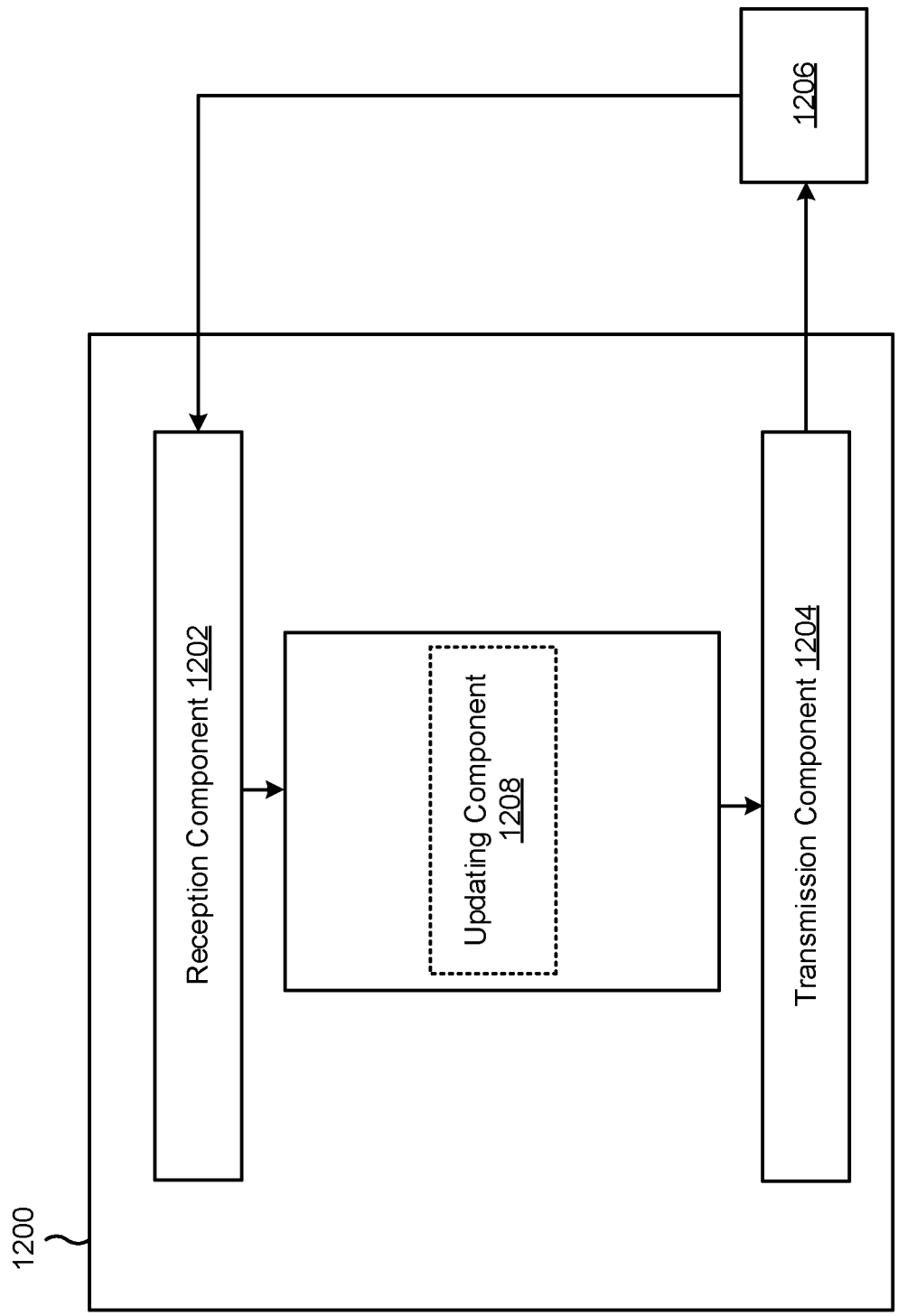
FIGS. 12 and 13 are block diagrams of example apparatuses for wireless communication, in accordance with the present disclosure.

FIG. 12 is a block diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include an updating component 1208, among other examples.

In some aspects, the apparatus 1200 may be configured to perform one or more operations described herein in connection with FIGS. 5-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

The reception component 1202 may receive a MAC message indicating a switch to an M-TRP transmission scheme. The transmission component 1204 may perform a communication using the M-TRP transmission scheme in accordance with the MAC message.

The updating component 1208 may update a repetition scheme parameter or a high speed capability parameter based at least in part on the MAC message.

The reception component 1202 may receive scheduling information prior to switching to the M-TRP transmission scheme, wherein the scheduling information schedules the communication to be performed after switching to the M-TRP transmission scheme, and wherein performing the communication further comprises performing the communication using a same M-TRP transmission scheme as was used to receive the scheduling information.

The transmission component 1204 may perform the communication using a same M-TRP transmission scheme as was used to receive the scheduling information.

The reception component 1202 may receive scheduling information prior to switching to the M-TRP transmission scheme, wherein the scheduling information schedules the communication to be performed after switching to the M-TRP transmission scheme, and wherein performing the communication further comprises performing the communication using the M-TRP transmission scheme indicated by the MAC message.

The transmission component 1204 may perform the communication using the M-TRP transmission scheme indicated by the MAC message.

The reception component 1202 may receive scheduling information prior to switching to the M-TRP transmission scheme, wherein the scheduling information schedules a reception after switching to the M-TRP transmission scheme, and may treat the scheduling information as an error.

The reception component 1202 may receive configuration information indicating a plurality of modes associated with a plurality of M-TRP transmission schemes, wherein the MAC message indicates a mode, of the plurality of modes, associated with the M-TRP transmission scheme.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
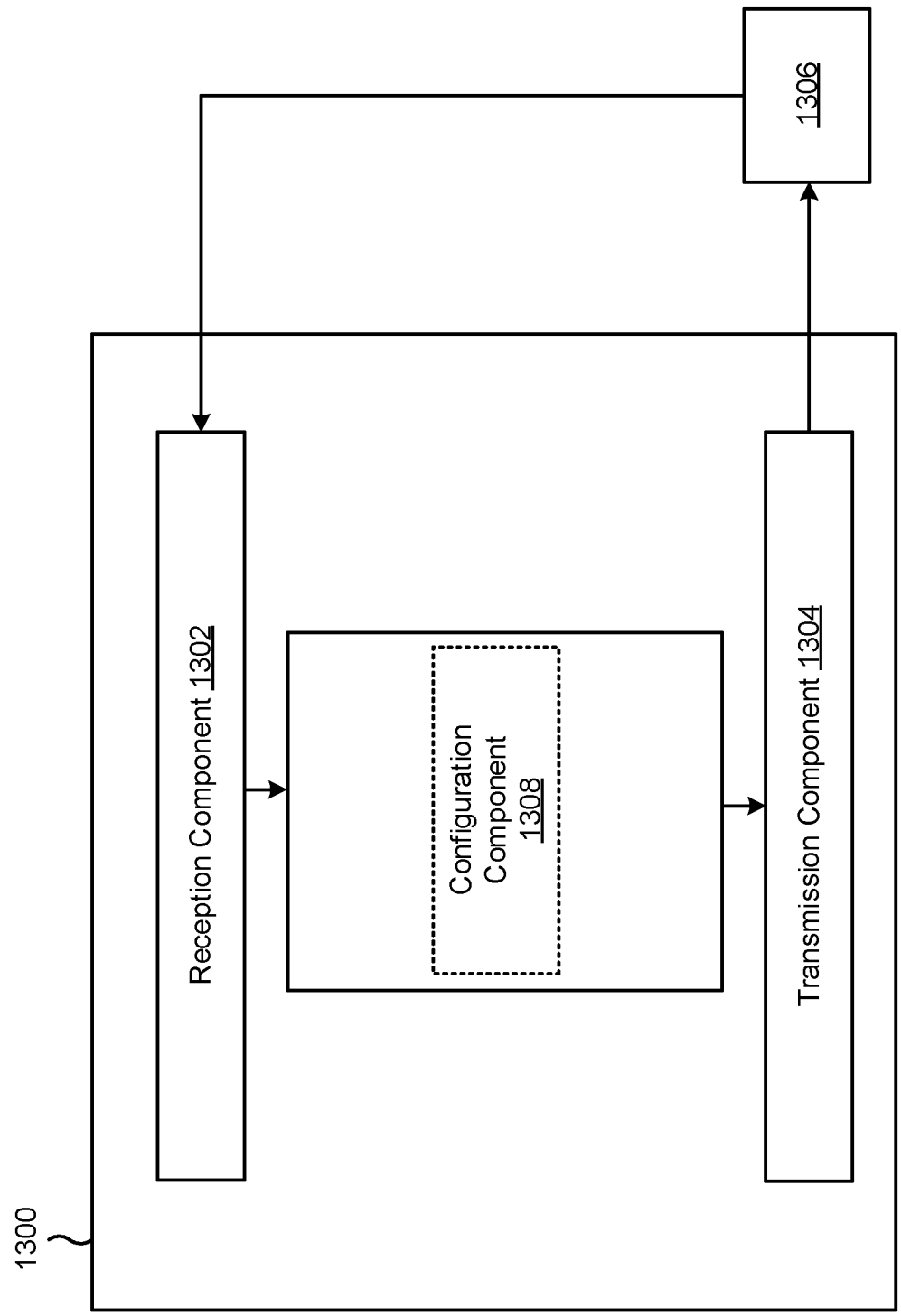

FIG. 13 is a block diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302, the transmission component 1304, a configuration component 1308, or a combination thereof.

In some aspects, the apparatus 1300 may be configured to perform one or more operations described herein in connection with FIGS. 3-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described above in connection with FIG. 2. In some aspects, the transmission component 1304 may be co-located with the reception component 1302 in a transceiver.

The transmission component 1304 may transmit, to a UE, a MAC message indicating a switch to an M-TRP transmission scheme. The transmission component 1304 may perform a communication using the M-TRP transmission scheme in accordance with the MAC message. In some aspects, the configuration component 1308 may configure the UE 1306, such as with one or more TCI states, one or more M-TRP transmission schemes, or the like.

The transmission component 1304 may transmit scheduling information prior to switching to the M-TRP transmission scheme, wherein the scheduling information schedules the communication to be performed after switching to the M-TRP transmission scheme.

The transmission component 1304 may perform the communication using a same M-TRP transmission scheme as was used to transmit the scheduling information.

The transmission component 1304 may transmit scheduling information prior to switching to the M-TRP transmission scheme, wherein the scheduling information schedules the communication to be performed after switching to the M-TRP transmission scheme, and wherein performing the communication further comprises performing the communication using a same M-TRP transmission scheme as was used to transmit the scheduling information.

The transmission component 1304 may perform the communication using the M-TRP transmission scheme indicated by the MAC message.

The transmission component 1304 may transmit configuration information indicating a plurality of modes associated with a plurality of M-TRP transmission schemes, wherein the MAC message indicates a mode, of the plurality of modes, associated with the M-TRP transmission scheme.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving a medium access control (MAC) message indicating a switch to a multiple transmit receive point (M-TRP) transmission scheme; and performing a communication using the M-TRP transmission scheme in accordance with the MAC message.

Aspect 2: The method of Aspect 1, wherein the MAC message indicates a time associated with the switch to the M-TRP transmission scheme, and wherein the method further comprises: switching to the M-TRP transmission scheme in accordance with the time.

Aspect 3: The method of Aspect 2, wherein the time is based at least in part on a capability of the UE.

Aspect 4: The method of any of Aspects 1-3, further comprising: updating a repetition scheme parameter or a high speed capability parameter based at least in part on the MAC message.

Aspect 5: The method of any of Aspects 1-4, wherein the MAC message is a first MAC message, and wherein the method further comprises: receiving a second MAC message indicating a transmission configuration indicator (TCI) state for the M-TRP transmission scheme, wherein performing the communication is based at least in part on the TCI state.

Aspect 6: The method of any of Aspects 1-5, wherein the communication is performed using a most recent transmission configuration indicator (TCI) state of the UE.

Aspect 7: The method of any of Aspects 1-6, wherein the MAC message is a transmission configuration indicator (TCI) activation message, and wherein a bit of the TCI activation message indicates the M-TRP transmission scheme.

Aspect 8: The method of any of Aspects 1-7, wherein the bit indicates whether to use an M-TRP transmission scheme associated with a single frequency network or an M-TRP scheme not associated with a single frequency network.

Aspect 9: The method of Aspect 7, wherein the bit indicates whether one or more activated TCI codepoints of the TCI activation message map to an M-TRP transmission scheme associated with a single frequency network or to an M-TRP scheme not associated with a single frequency network.

Aspect 10: The method of any of Aspects 1-9, further comprising: receiving scheduling information prior to switching to the M-TRP transmission scheme, wherein the scheduling information schedules the communication to be performed after switching to the M-TRP transmission scheme, and wherein performing the communication further comprises: performing the communication using a same M-TRP transmission scheme as was used to receive the scheduling information.

Aspect 11: The method of any of Aspects 1-9, further comprising: receiving scheduling information prior to switching to the M-TRP transmission scheme, wherein the scheduling information schedules the communication to be performed after switching to the M-TRP transmission scheme, and wherein performing the communication further comprises: performing the communication using the M-TRP transmission scheme indicated by the MAC message.

Aspect 12: The method of any of Aspects 1-9, further comprising: receiving scheduling information prior to switching to the M-TRP transmission scheme, wherein the scheduling information schedules a reception after switching to the M-TRP transmission scheme, and wherein the method further comprises: treating the scheduling information as an error.

Aspect 13: The method of any of Aspects 1-12, further comprising: receiving configuration information indicating a plurality of modes associated with a plurality of M-TRP transmission schemes, wherein the MAC message indicates a mode, of the plurality of modes, associated with the M-TRP transmission scheme.

Aspect 14: The method of Aspect 13, wherein the MAC message indicates one or more modes associated with two or more M-TRP transmission schemes including the M-TRP transmission scheme, and wherein the method further comprises: receiving downlink control information indicating the M-TRP transmission scheme, wherein performing the communication is based at least in part on the downlink control information.

Aspect 15: The method of Aspect 13, wherein the configuration information indicates one or more parameters associated with the plurality of modes.

Aspect 16: The method of any of Aspects 1-15, wherein the M-TRP transmission scheme is a first M-TRP transmission scheme, and wherein the method further comprises: switching from a second M-TRP transmission scheme to the first M-TRP transmission scheme based at least in part on the MAC message.

Aspect 17: The method of any of Aspects 1-16, wherein the M-TRP transmission scheme is one of: an M-TRP transmission scheme associated with a single frequency network, a time division multiplexing based M-TRP transmission scheme, a frequency division multiplexing based M-TRP transmission scheme, or a spatial division multiplexing based M-TRP transmission scheme.

Aspect 18: A method of wireless communication performed by a base station, comprising: transmitting, to a user equipment (UE), a medium access control (MAC) message indicating a switch to a multiple transmit receive point (M-TRP) transmission scheme; and performing a communication using the M-TRP transmission scheme in accordance with the MAC message.

Aspect 19: The method of Aspect 18, wherein the MAC message indicates a time associated with the switch to the M-TRP transmission scheme, and wherein the method further comprises: switching to the M-TRP transmission scheme in accordance with the time.

Aspect 20: The method of any of Aspects 18-19, wherein the time is based at least in part on a capability of the UE.

Aspect 21: The method of any of Aspects 18-20, wherein the MAC message is a first MAC message, and wherein the method further comprises: transmitting a second MAC message indicating a transmission configuration indicator (TCI) state for the M-TRP transmission scheme, wherein performing the communication is based at least in part on the TCI state.

Aspect 22: The method of any of Aspects 18-21, wherein the communication is performed using a most recent transmission configuration indicator (TCI) state of the UE.

Aspect 23: The method of any of Aspects 18-22, wherein the MAC message is a transmission configuration indicator (TCI) activation message, and wherein a bit of the TCI activation message indicates the M-TRP transmission scheme.

Aspect 24: The method of Aspect 23, wherein the bit indicates whether to use an M-TRP transmission scheme associated with a single frequency network or an M-TRP scheme not associated with a single frequency network.

Aspect 25: The method of Aspect 23, wherein the bit indicates whether one or more activated TCI codepoints of the TCI activation message map to an M-TRP transmission scheme associated with a single frequency network or an M-TRP scheme not associated with a single frequency network.

Aspect 26: The method of any of Aspects 18-25, further comprising: transmitting scheduling information prior to switching to the M-TRP transmission scheme, wherein the scheduling information schedules the communication to be performed after switching to the M-TRP transmission scheme, and wherein performing the communication further comprises: performing the communication using a same M-TRP transmission scheme as was used to transmit the scheduling information.

Aspect 27: The method of any of Aspects 18-25, further comprising: transmitting scheduling information prior to switching to the M-TRP transmission scheme, wherein the scheduling information schedules the communication to be performed after switching to the M-TRP transmission scheme, and wherein performing the communication further comprises: performing the communication using the M-TRP transmission scheme indicated by the MAC message.

Aspect 28: The method of any of Aspects 18-27, further comprising: transmitting configuration information indicating a plurality of modes associated with a plurality of M-TRP transmission schemes, wherein the MAC message indicates a mode, of the plurality of modes, associated with the M-TRP transmission scheme.

Aspect 29: The method of Aspect 28, wherein the MAC message indicates one or more modes associated with two or more M-TRP transmission schemes including the M-TRP transmission scheme, and wherein the method further comprises: transmitting downlink control information indicating the M-TRP transmission scheme, wherein performing the communication is based at least in part on the downlink control information.

Aspect 30: The method of Aspect 28, wherein the configuration information indicates one or more parameters associated with the plurality of modes.

Aspect 31: The method of any of Aspects 18-30, wherein the M-TRP transmission scheme is a first M-TRP transmission scheme, and wherein the method further comprises: switching from a second M-TRP transmission scheme to the first M-TRP transmission scheme based at least in part on the MAC message.

Aspect 32: The method of any of Aspects 18-31, wherein the M-TRP transmission scheme is one of: an M-TRP transmission scheme associated with a single frequency network, a time division multiplexing based M-TRP transmission scheme, a frequency division multiplexing based M-TRP transmission scheme, or a spatial division multiplexing based M-TRP transmission scheme.

Aspect 33: An apparatus for wireless communication at a device, comprising a processor; memory coupled with the processor; and instructions stored in the memory and executable by the processor to cause the apparatus to perform the method of one or more Aspects of Aspects 1-17.

Aspect 34: An apparatus for wireless communication at a device, comprising a processor; memory coupled with the processor; and instructions stored in the memory and executable by the processor to cause the apparatus to perform the method of one or more Aspects of Aspects 18-32.

Aspect 35: A device for wireless communication, comprising a memory and one or more processors coupled to the memory, the memory and the one or more processors configured to perform the method of one or more Aspects of Aspects 1-17.

Aspect 36: A device for wireless communication, comprising a memory and one or more processors coupled to the memory, the memory and the one or more processors configured to perform the method of one or more Aspects of Aspects 18-32.

Aspect 37: An apparatus for wireless communication, comprising at least one means for performing the method of one or more Aspects of Aspects 1-17.

Aspect 38: An apparatus for wireless communication, comprising at least one means for performing the method of one or more Aspects of Aspects 18-32.

Aspect 39: A non-transitory computer-readable medium storing code for wireless communication, the code comprising instructions executable by a processor to perform the method of one or more Aspects of Aspects 1-17.

Aspect 40: A non-transitory computer-readable medium storing code for wireless communication, the code comprising instructions executable by a processor to perform the method of one or more Aspects of Aspects 18-32.

Aspect 41: A non-transitory computer-readable medium storing a set of instructions for wireless communication, the set of instructions comprising one or more instructions that, when executed by one or more processors of a device, cause the device to perform the method of one or more Aspects of Aspects 1-17.

Aspect 42: A non-transitory computer-readable medium storing a set of instructions for wireless communication, the set of instructions comprising one or more instructions that, when executed by one or more processors of a device, cause the device to perform the method of one or more Aspects of Aspects 18-32.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based at least in part on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a medium access control (MAC) message indicating a switch to a first multiple transmit receive point (M-TRP) transmission scheme;
   switching from a second M-TRP transmission scheme to the first M-TRP transmission scheme based at least in part on the MAC message; and
   performing a communication using the first M-TRP transmission scheme in accordance with the MAC message.

2. The method of claim 1, wherein the MAC message indicates a time associated with the switch to the first M-TRP transmission scheme, and wherein the method further comprises:
   switching to the first M-TRP transmission scheme in accordance with the time.

3. The method of claim 2, wherein the time is based at least in part on a capability of the UE.

4. The method of claim 1, further comprising:
   updating a repetition scheme parameter or a high speed capability parameter based at least in part on the MAC message.

5. The method of claim 1, wherein the MAC message is a first MAC message, and wherein the method further comprises:
   receiving a second MAC message indicating a transmission configuration indicator (TCI) state for the first M-TRP transmission scheme, wherein performing the communication is based at least in part on the TCI state.

6. The method of claim 1, wherein the communication is performed using a most recent transmission configuration indicator (TCI) state of the UE.

7. The method of claim 1, wherein the MAC message is a transmission configuration indicator (TCI) activation message, and wherein a bit of the TCI activation message indicates the first M-TRP transmission scheme.

8. The method of claim 7, wherein the bit indicates whether to use an M-TRP transmission scheme associated with a single frequency network or an M-TRP scheme not associated with a single frequency network.

9. The method of claim 7, wherein the bit indicates whether one or more activated TCI codepoints of the TCI activation message map to an M-TRP transmission scheme associated with a single frequency network or to an M-TRP scheme not associated with a single frequency network.

10. The method of claim 1, further comprising:
    receiving scheduling information prior to switching to the first M-TRP transmission scheme, wherein the scheduling information schedules the communication to be performed after switching to the first M-TRP transmission scheme, and wherein performing the communication further comprises:
    performing the communication using a same M-TRP transmission scheme as was used to receive the scheduling information.

11. The method of claim 1, further comprising:
    receiving scheduling information prior to switching to the first M-TRP transmission scheme, wherein the scheduling information schedules the communication to be performed after switching to the first M-TRP transmission scheme, and wherein performing the communication further comprises:
    performing the communication using the first M-TRP transmission scheme indicated by the MAC message.

12. The method of claim 1, further comprising:
    receiving scheduling information prior to switching to the first M-TRP transmission scheme, wherein the scheduling information schedules a reception after switching to the first M-TRP transmission scheme, and wherein the method further comprises:
    treating the scheduling information as an error.

13. The method of claim 1, further comprising:
    receiving configuration information indicating a plurality of modes associated with a plurality of M-TRP transmission schemes, wherein the MAC message indicates a mode, of the plurality of modes, associated with the first M-TRP transmission scheme.

14. The method of claim 13, wherein the MAC message indicates one or more modes associated with two or more M-TRP transmission schemes including the first M-TRP transmission scheme, and wherein the method further comprises:
    receiving downlink control information indicating the first M-TRP transmission scheme, wherein performing the communication is based at least in part on the downlink control information.

15. The method of claim 13, wherein the configuration information indicates one or more parameters associated with the plurality of modes.

16. The method of claim 1, wherein the first M-TRP transmission scheme is one of an M-TRP transmission scheme associated with a single frequency network, a time division multiplexing based M-TRP transmission scheme, a frequency division multiplexing based M-TRP transmission scheme, or a spatial division multiplexing based M-TRP transmission scheme; and
    wherein the second M-TRP transmission scheme is a different one of the M-TRP transmission scheme associated with the single frequency network, the time division multiplexing based M-TRP transmission scheme, the frequency division multiplexing based M-TRP transmission scheme, or the spatial division multiplexing based M-TRP transmission scheme.

17. A UE, comprising:
    one or more memories; and one or more processors, coupled to the one or more memories, configured to:
- receive a medium access control (MAC) message indicating a switch to a first multiple transmit receive point (M-TRP) transmission scheme;
- switch from a second M-TRP transmission scheme to the first M-TRP transmission scheme based at least in part on the MAC message; and
- perform a communication using the first M-TRP transmission scheme in accordance with the MAC message.

18. The UE of claim 17, wherein the MAC message indicates a time associated with the switch to the first M-TRP transmission scheme, and wherein the one or more processors are further configured to:
- switch to the first M-TRP transmission scheme in accordance with the time.

19. The UE of claim 17, wherein the one or more processors are further configured to:
- update a repetition scheme parameter or a high speed capability parameter based at least in part on the MAC message.

20. The UE of claim 18, wherein the MAC message is a first MAC message, and wherein the one or more processors are further configured to:
- receive a second MAC message indicating a transmission configuration indicator (TCI) state for the first M-TRP transmission scheme, and
- wherein performing the communication is based at least in part on the TCI state.

21. The UE of claim 18, wherein the MAC message is a transmission configuration indicator (TCI) activation message, and wherein a bit of the TCI activation message indicates the first M-TRP transmission scheme.

22. The UE of claim 18, wherein the first M-TRP transmission scheme is one of an M-TRP transmission scheme associated with a single frequency network, a time division multiplexing based M-TRP transmission scheme, a frequency division multiplexing based M-TRP transmission scheme, or a spatial division multiplexing based M-TRP transmission scheme; and
- wherein the second M-TRP transmission scheme is a different one of the M-TRP transmission scheme associated with the single frequency network, the time division multiplexing based M-TRP transmission scheme, the frequency division multiplexing based M-TRP transmission scheme, or the spatial division multiplexing based M-TRP transmission scheme.

23. A non-transitory computer-readable medium storing a set of instructions, the set of instructions comprising:
one or more instructions that, when executed by one or more processors of a UE, cause the UE to:
- receive a medium access control (MAC) message indicating a switch to a first multiple transmit receive point (M-TRP) transmission scheme;
- switch from a second M-TRP transmission scheme to the first M-TRP transmission scheme based at least in part on the MAC message; and
- perform a communication using the first M-TRP transmission scheme in accordance with the MAC message.

24. The non-transitory computer-readable medium of claim 23, wherein the first M-TRP transmission scheme is one of an M-TRP transmission scheme associated with a single frequency network, a time division multiplexing based M-TRP transmission scheme, a frequency division multiplexing based M-TRP transmission scheme, or a spatial division multiplexing based M-TRP transmission scheme; and
- wherein the second M-TRP transmission scheme is a different one of the M-TRP transmission scheme associated with the single frequency network, the time division multiplexing based M-TRP transmission scheme, the frequency division multiplexing based M-TRP transmission scheme, or the spatial division multiplexing based M-TRP transmission scheme.

25. An apparatus, comprising:
- means for receiving a medium access control (MAC) message indicating a switch to a first multiple transmit receive point (M-TRP) transmission scheme;
- means for switching from a second M-TRP transmission scheme to the first M-TRP transmission scheme based at least in part on the MAC message; and
- means for performing a communication using the first M-TRP transmission scheme in accordance with the MAC message.

26. The apparatus of claim 25, wherein the first M-TRP transmission scheme is one of an M-TRP transmission scheme associated with a single frequency network, a time division multiplexing based M-TRP transmission scheme, a frequency division multiplexing based M-TRP transmission scheme, or a spatial division multiplexing based M-TRP transmission scheme; and
- wherein the second M-TRP transmission scheme is a different one of the M-TRP transmission scheme associated with the single frequency network, the time division multiplexing based M-TRP transmission scheme, the frequency division multiplexing based M-TRP transmission scheme, or the spatial division multiplexing based M-TRP transmission scheme.

* * * * *